US009995151B2

United States Patent
Sezer et al.

(10) Patent No.: US 9,995,151 B2
(45) Date of Patent: Jun. 12, 2018

(54) ARTICLE AND MANIFOLD FOR THERMAL ADJUSTMENT OF A TURBINE COMPONENT

(71) Applicant: GENERAL ELECTRIC COMPANY, Schenectady, NY (US)

(72) Inventors: Ibrahim Sezer, Greenville, SC (US); Gary Michael Itzel, Simpsonville, SC (US); Jaime Javier Maldonado, Simpsonville, SC (US); Sandip Dutta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 14/828,094

(22) Filed: Aug. 17, 2015

(65) Prior Publication Data
US 2017/0051612 A1 Feb. 23, 2017

(51) Int. Cl.
*F01D 5/18* (2006.01)
*F01D 9/02* (2006.01)
(Continued)

(52) U.S. Cl.
CPC ............ *F01D 5/189* (2013.01); *F01D 5/186* (2013.01); *F01D 9/02* (2013.01); *F01D 25/12* (2013.01);
(Continued)

(58) Field of Classification Search
CPC .......... F01D 5/186; F01D 5/187; F01D 5/188; F01D 5/189; F01D 9/02; F01D 9/04;
(Continued)

(56) References Cited

U.S. PATENT DOCUMENTS

| 3,730,440 A | 5/1973 | Parkison |
| 3,974,647 A | 8/1976 | Lewis et al. |

(Continued)

FOREIGN PATENT DOCUMENTS

| EP | 1 284 338 A2 | 2/2003 |
| EP | 1 865 259 A2 | 12/2007 |
| EP | 3 098 386 A1 | 11/2016 |
| FR | 2 916 475 A1 | 11/2008 |
| GB | 2492374 A | 1/2013 |
| WO | 03/062607 A1 | 7/2003 |

OTHER PUBLICATIONS

Extended European Search Report and Opinion issued in connection with corresponding EP Application No. 16181782.0, dated Dec. 21, 2016.

*Primary Examiner* — Jason Shanske
*Assistant Examiner* — Christopher R Legendre
(74) *Attorney, Agent, or Firm* — McNees Wallace & Nurick LLC

(57) ABSTRACT

An article is disclosed including a manifold, an article wall having at least one external aperture, and a post-impingement cavity disposed between the manifold and the article wall. The manifold includes an impingement plate defining a plenum having a plenum surface, and at least one impingement aperture. The at least one impingement aperture interfaces with the plenum at an intake aperture having a flow modification structure, which, together with the at least one impingement aperture, defines an exhaust aperture. The manifold exhausts a fluid from the plenum into the intake aperture, through the at least one impingement aperture, out the exhaust aperture, into the post-impingement cavity, and through the at least one external aperture.

13 Claims, 4 Drawing Sheets

(51) Int. Cl.
*F01D 25/12* (2006.01)
*F02C 7/12* (2006.01)
*F23R 3/00* (2006.01)

(52) U.S. Cl.
CPC ............... *F02C 7/12* (2013.01); *F23R 3/002* (2013.01); *F05D 2250/32* (2013.01); *F05D 2250/324* (2013.01); *F05D 2260/201* (2013.01); *F05D 2260/2212* (2013.01); *F23R 2900/03043* (2013.01); *F23R 2900/03044* (2013.01); *F23R 2900/03045* (2013.01)

(58) Field of Classification Search
CPC ........ F01D 11/001; F01D 11/08; F01D 25/12; F02C 7/12; F05D 2240/11; F05D 2250/32; F05D 2250/324; F05D 2250/33; F05D 2250/37; F05D 2260/201; F23R 3/002; F23R 2900/03043; F23R 2900/03044; F23R 2900/03045
See application file for complete search history.

(56) References Cited

U.S. PATENT DOCUMENTS

| | | | |
|---|---|---|---|
| 5,242,119 | A | 9/1993 | Jariyasunant |
| 6,000,908 | A | 12/1999 | Bunker |
| 6,289,981 | B1 | 9/2001 | Tokizaki et al. |
| 6,554,563 | B2* | 4/2003 | Noe .............. F01D 5/189 415/115 |
| 7,052,233 | B2 | 5/2006 | Fried et al. |
| 7,926,278 | B2* | 4/2011 | Gerendas .............. F23R 3/002 60/725 |
| 2007/0169992 | A1 | 7/2007 | Wasif et al. |
| 2013/0047618 | A1* | 2/2013 | Gregory .............. F23R 3/002 60/722 |
| 2013/0081401 | A1 | 4/2013 | Kim |
| 2013/0156549 | A1 | 6/2013 | Maldonado |
| 2013/0209228 | A1 | 8/2013 | Xu |
| 2014/0271115 | A1 | 9/2014 | Duge et al. |
| 2017/0051612 | A1* | 2/2017 | Sezer .............. F01D 5/185 |

* cited by examiner

ARTICLE AND MANIFOLD FOR THERMAL ADJUSTMENT OF A TURBINE COMPONENT

FIELD OF THE INVENTION

The present invention is directed to articles and manifolds for thermal adjustment of turbine components. More particularly, the present invention is directed to articles and manifolds for thermal adjustment of turbine components including impingement flow modification structures.

BACKGROUND OF THE INVENTION

Gas turbines airfoils such as nozzles are subjected to intense heat and external pressures in the hot gas path. These rigorous operating conditions are exacerbated by advances in the technology, which may include both increased operating temperatures and greater hot gas path pressures. As a result, gas turbine nozzles are sometimes cooled by flowing a fluid through a manifold inserted into the core of the nozzle, which exits the manifold through impingement holes into a post-impingement cavity, and which then exits the post-impingement cavity through apertures in the exterior wall of the nozzle, forming a film layer of the fluid on the exterior of the nozzle.

However, crossflow in the post-impingement cavity and non-optimized flow paths inhibit fluid cooling in the post-impingement cavity. The rigorous operating conditions, materials and manufacturing techniques have maintained or even exacerbated crossflow in the post-impingement cavity and non-optimized flow paths.

BRIEF DESCRIPTION OF THE INVENTION

In an exemplary embodiment, an article includes a manifold, an article wall and a post-impingement cavity. The manifold includes an impingement plate, and the impingement plate defines a plenum and at least one impingement aperture. The plenum includes a plenum surface, and the at least one impingement aperture interfaces with the plenum at an intake aperture. The article wall includes at least one external aperture. The post-impingement cavity is disposed between the manifold and the article wall, and the post-impingement cavity arranged to receive a fluid from the plenum through the at least one impingement aperture and pass the fluid through the at least one external aperture. The at least one impingement aperture includes a flow modification structure, and the at least one impingement aperture and the flow modification structure define an exhaust aperture.

In another exemplary embodiment, a manifold includes an impingement plate. The impingement plate defines a plenum and at least one impingement aperture. The plenum includes a plenum surface, and the at least one impingement aperture interfaces with the plenum at an intake aperture. The at least one impingement aperture includes a flow modification structure, and the at least one impingement aperture and the flow modification structure define an exhaust aperture. The manifold is arranged to exhaust a fluid from the plenum into the intake aperture, through the at least one impingement aperture, and out the exhaust aperture.

In another exemplary embodiment, a method for thermal adjustment of a turbine component includes providing a manifold having an impingement plate, the impingement plate defining a plenum and at least one impingement aperture. The at least one impingement aperture includes a flow modification structure. The method further includes dispersing a flow of a fluid from the plenum through the at least one impingement aperture, and altering the flow of the fluid by interaction with the flow modification structure. The flow of the fluid altered by the flow modification structure increases thermal contact between the fluid and a portion of the turbine component in comparison to an otherwise identical flow unimpeded by the flow modification structure.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary articles, airfoil components and methods of forming articles and airfoil components. Embodiments of the present disclosure, in comparison to articles and methods not utilizing one or more features disclosed herein, better accommodate differential thermal expansion, increase tolerance of aerodynamic loads, improve cooling, improve durability, increase efficiency, improve local back flow margin and improve film effectiveness.

Figure 1:
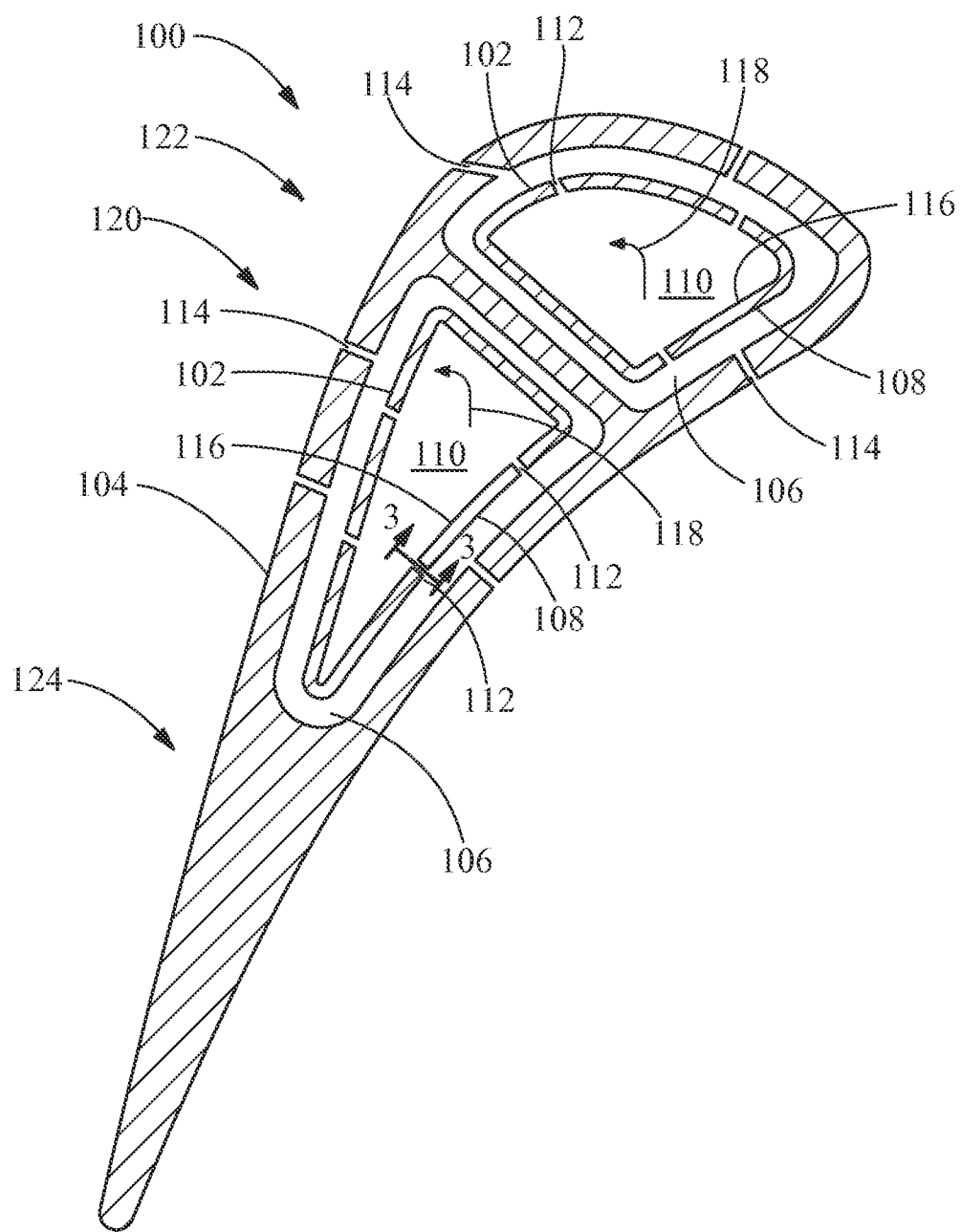
FIG. 1 is a cross-sectional view of an article, according to an embodiment of the present disclosure.
Figure 2:
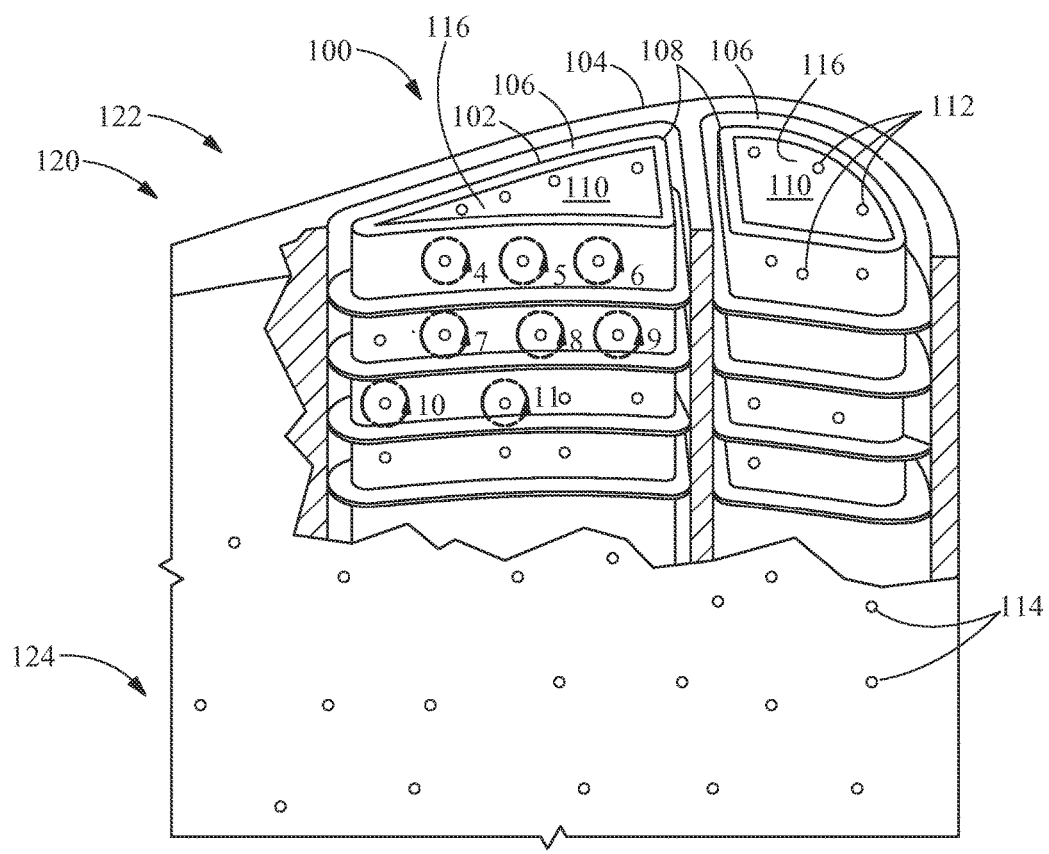
FIG. 2 is a cut-away perspective view of the article of FIG. 1, according to an embodiment of the present disclosure.

Referring to FIGS. 1 and 2, in one embodiment an article 100 includes a manifold 102, an article wall 104 and a post-impingement cavity 106 disposed between the manifold 102 and the article wall 104. The manifold 102 includes an impingement plate 108. The impingement plate 108 defines a plenum 110 and at least one impingement aperture 112. The article wall 104 includes at least one external aperture 114. The plenum 110 includes a plenum surface 116. The post-impingement cavity 106 is arranged to receive a fluid 118 from the plenum 110 through the at least one impingement aperture 112 and pass the fluid 118 through the at least one external aperture 114.

In a further embodiment, the article 100 is a turbine component 120. The turbine component 120 may be any suitable component, including, but not limited to, an airfoil 122, a bucket (not shown), a nozzle 124, a shroud (not shown), a combustor (not shown), or a combination thereof. The manifold 102 may be any suitable turbine manifold, including, but not limited to, a turbine airfoil 122 manifold, a turbine bucket (not shown) manifold, a turbine nozzle 124 manifold, a turbine shroud (not shown) manifold, a turbine combustor (not shown) manifold, or a combination thereof.

Figure 3:
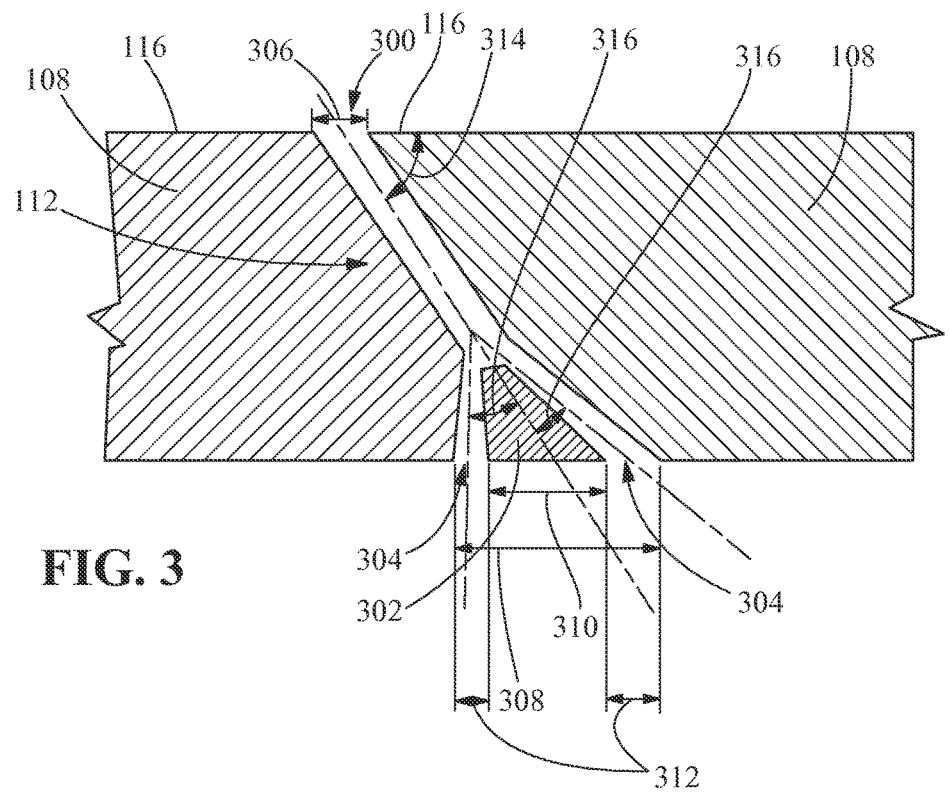
FIG. 3 is a cross-sectional view of at least one impingement aperture viewed in direction 3-3 of FIG. 1, according to an embodiment of the present disclosure.

Referring to FIG. 3, in one embodiment, the at least one impingement aperture 112 interfaces with the plenum 110 at an intake aperture 300. The at least one impingement aperture 112 includes a flow modification structure 302. The at least one impingement aperture 112 and the flow modification structure 302 define an exhaust aperture 304. The exhaust aperture 304 may include any suitable shape. Referring also to FIG. 1, the manifold 102 is arranged to exhaust a fluid 118 from the plenum 110 into the intake aperture 300, through the at least one impingement aperture 112, and out the exhaust aperture 304.

In one embodiment, the intake aperture 300 includes an intake area 306 at the plenum 110, and the exhaust aperture 304 includes at least one exhaust area 312 at the post-impingement cavity 106. The at least one exhaust area 312 is the difference between the impingement area 308 of the at least one impingement aperture 112 at the post-impingement cavity 106 and the flow modification structure area 310 at the post-impingement cavity 106. In a further embodiment, the at least one exhaust area 312 is between about 10% to about 500% of the intake area 306, alternatively about 10% to about 100% of the intake area 306, alternatively about 50% to about 150% of the intake area 306, alternatively about 100% to about 200% of the intake area 306, alternatively about 150% to about 250% of the intake area 306, alternatively about 200% to about 300% of the intake area 306, alternatively about 250% to about 350% of the intake area 306, alternatively about 300% to about 400% of the intake area 306, alternatively about 350% to about 450% of the intake area 306, alternatively about 400% to about 500% of the intake area 306.

In another embodiment, the at least one impingement aperture 112 defines an impingement angle 314 relative to the plenum surface 116. The impingement angle 314 may be any suitable angle, including, but not limited to, about 30° to 90°, alternatively about 30° to about 60°, alternatively about 45° to about 75°, alternatively about 60° to 90°, alternatively about 30° to about 45°, alternatively about 45° to about 60°, alternatively about 60° to about 75°, alternatively about 70° to 90°. The exhaust aperture 304 may deflect from the impingement angle by a deflection angle 316 of up to about 60°, alternatively up to about 45°, alternatively up to about 30°, alternatively up to about 15°, alternatively between 0° to about 30°, alternatively between about 15° to about 45°, alternatively between about 30° to about 60°. As used herein, the "deflection angle 316" is not required to be constant for the entirety of the exhaust aperture 304, but rather is a parameter which may vary about the exhaust aperture 304.

Figure 4:
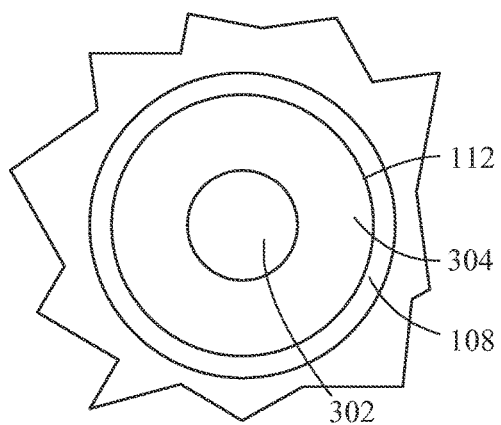
FIG. 4 is an expanded view of area 4 of FIG. 2, according to an embodiment of the present disclosure.
Figure 5:
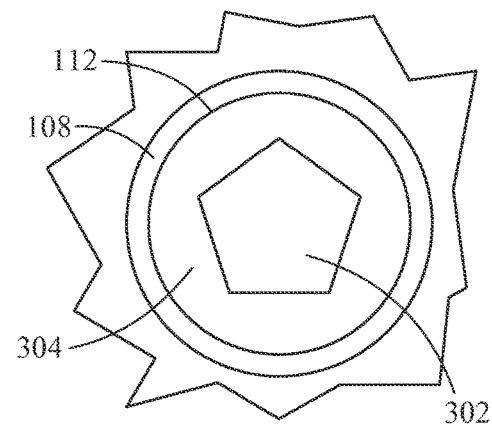
FIG. 5 is an expanded view of area 5 of FIG. 2, according to an embodiment of the present disclosure.
Figure 6:
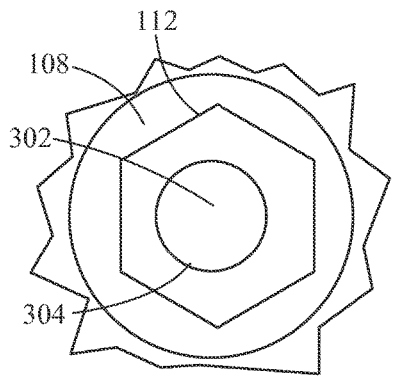
FIG. 6 is an expanded view of area 6 of FIG. 2, according to an embodiment of the present disclosure.
Figure 7:
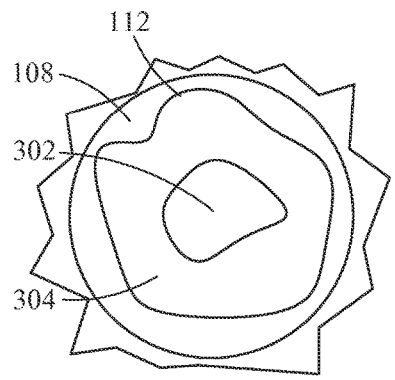
FIG. 7 is an expanded view of area 7 of FIG. 2, according to an embodiment of the present disclosure.

Referring to FIG. 4, in one embodiment, the exhaust aperture 304 is annular. As used herein, "annular" indicates generally ring-shaped, which may include, but is not limited to, a regular ring, an irregular ring, a circular ring, an elliptical ring, an ovular ring, a symmetrical ring, an asymmetrical ring, or a combination thereof. As used herein, an "irregular ring" indicates that the thickness or width or both of the ring varies about the circumference of the ring. Referring to FIGS. 5 and 6, in a further embodiment, an annular exhaust aperture 304 includes wherein at least one of the at least one impingement aperture 112 and the flow modification structure 302 has a polygonal conformation. Referring to FIG. 7, in another further embodiment, an annular exhaust aperture 304 includes wherein at least one of the at least one impingement aperture 112 and the flow modification structure 302 has an irregular geometry.

Figure 8:
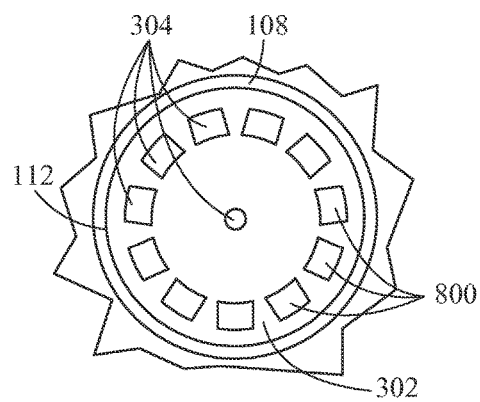
FIG. 8 is an expanded view of area 8 of FIG. 2, according to an embodiment of the present disclosure.

Referring to FIG. 8, in one embodiment, the flow modification structure 302 includes a plurality of flow distribution apertures 800.

Figure 9:
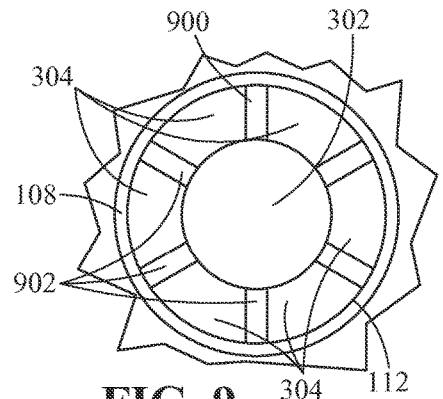
FIG. 9 is an expanded view of area 9 of FIG. 2, according to an embodiment of the present disclosure.
Figure 10:
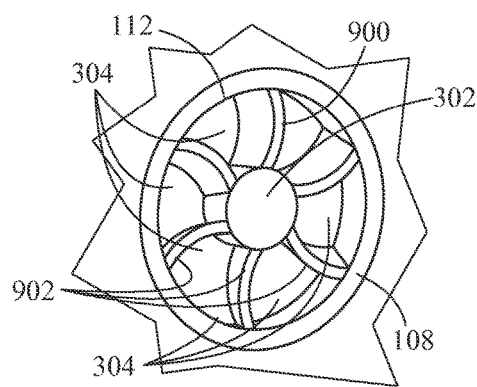
FIG. 10 is an expanded perspective view of area 10 of FIG. 2, according to an embodiment of the present disclosure.

Referring to FIG. 9, in one embodiment, the flow modification structure 302 includes a turbulator 900. In a further embodiment, the turbulator 900 includes at least one vane 902. Referring to FIG. 10, in yet a further embodiment, the at least one vane may include a torsional conformation.

Figure 11:
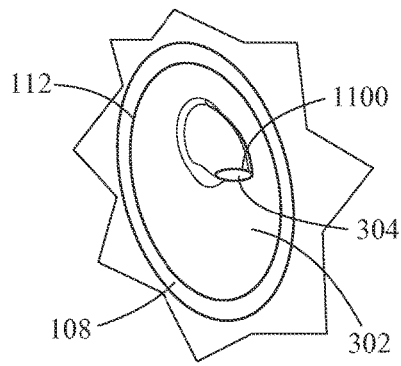
FIG. 11 is an expanded perspective view of area 11 of FIG. 2, according to an embodiment of the present disclosure.

Referring to FIG. 11, in one embodiment, the flow modification structure 302 includes a directional nozzle 1100. The directional nozzle 1100 may direct a flow of the fluid 118 in any suitable direction into the post-impingement cavity 106.

In one embodiment, a method for thermal adjustment of article 100, including, but not limited to, a turbine component 120, includes providing a manifold 102 having an impingement plate 108, the impingement plate 108 defining a plenum 110 and at least one impingement aperture 112, the at least one impingement aperture 112 including a flow modification structure 302. A fluid 118 is dispersed from the plenum 110 through the at least one impingement aperture 112. The flow of the fluid 118 in the at least one impingement aperture 112 is altered by interaction with the flow modification structure 302. Altering the flow of the fluid altered by the flow modification structure increases thermal contact between the fluid 118 and a portion of the article 100 in comparison to an otherwise identical flow unimpeded by the flow modification structure 302.

The flow modification structure 302 may be formed by any suitable method, including, but not limited to, an additive manufacturing technique, casting, or a combinations thereof. The additive manufacturing technique may include any suitable technique, including, but not limited to, direct metal laser melting, direct metal laser sintering, selective laser melting, selective laser sintering, electron beam melting, laser metal deposition or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. An article, comprising:
a manifold including an impingement plate, the impingement plate defining a plenum and at least one impingement aperture, the plenum having a plenum surface and the at least one impingement aperture interfacing with the plenum at an intake aperture;
an article wall including at least one external aperture; and a post-impingement cavity disposed between the manifold and the article wall, the post-impingement cavity arranged to receive a fluid from the plenum through the at least one impingement aperture and pass the fluid through the at least one external aperture, wherein the at least one impingement aperture includes:
a flow modification structure in contact with the impingement plate; and
an exhaust aperture, and wherein the exhaust aperture is defined by:
the flow modification structure; or
the at least one impingement aperture and the flow modification structure.

2. The article of claim 1, wherein the intake aperture includes an intake area, the exhaust aperture includes at least one exhaust area, and the at least one exhaust area is between 10% to 500% of the intake area.

3. The article of claim 1, wherein the at least one impingement aperture defines an impingement angle relative to the plenum surface between 30° and 90°.

4. The article of claim 3, wherein the exhaust aperture deflects from the impingement angle by a deflection angle of up to 60°.

5. The article of claim 1, wherein the exhaust aperture is defined by the at least one impingement aperture and the flow modification structure, and the exhaust aperture is annular.

6. The article of claim 1, wherein the exhaust aperture is defined by the at least one impingement aperture and the flow modification structure, and the flow modification structure includes a turbulator.

7. The article of claim 6, wherein the turbulator includes at least one vane.

8. The article of claim 7, wherein the at least one vane includes a torsional conformation.

9. The article of claim 1, wherein the exhaust aperture is defined by the flow modification structure, and the flow modification structure includes a plurality of flow distribution apertures.

10. The article of claim 1, wherein the exhaust aperture is defined by the flow modification structure, and the flow modification structure includes a directional nozzle.

11. The article of claim 1, wherein the article is a turbine component selected from the group consisting of an airfoil, a bucket, a nozzle, a shroud, a combustor, and combinations thereof.

12. A manifold, comprising an impingement plate, the impingement plate defining a plenum and at least one impingement aperture, wherein:
the plenum includes a plenum surface;
the at least one impingement aperture interfaces with the plenum at an intake aperture;
the at least one impingement aperture includes a flow modification structure in contact with the impingement plate;
the at least one impingement aperture includes an exhaust aperture;
the exhaust aperture is annular;
the exhaust aperture is defined by the at least one impingement aperture and the flow modification structure; and
the manifold is arranged to exhaust a cooling fluid from the plenum into the intake aperture, through the at least one impingement aperture, and out the exhaust aperture.

13. A manifold, comprising an impingement plate, the impingement plate defining a plenum and at least one impingement aperture, wherein:
the plenum includes a plenum surface;
the at least one impingement aperture interfaces with the plenum at an intake aperture;
the at least one impingement aperture includes a flow modification structure in contact with the impingement plate;
the flow modification structure includes a directional nozzle;
the at least one impingement aperture includes an exhaust aperture;
the exhaust aperture is defined by the flow modification structure; and
the manifold is arranged to exhaust a cooling fluid from the plenum into the intake aperture, through the at least one impingement aperture, and out the exhaust aperture.

* * * * *